Patented Aug. 28, 1934

1,971,656

UNITED STATES PATENT OFFICE 1,971,656

PREPARATION OF VINYLACETYLENE

Granville A. Perkins and Walter J. Toussaint, South Charleston, W. Va., assignors to Carbide and Carbon Chemicals Corporation, a corporation of New York No Drawing. Application January 30, 1932, Serial No. 589,976

19 Claims. (Cl. 260—170)

The invention is an improved process for making vinylacetylene, $CH_2:CH.C : CH$, from acetylene. According to our invention acetylene is polymerized in the presence of a catalyst in such a manner and under such conditions as to minimize the formation of substances having molecular weights greater than that of the desired vinylacetylene. In general the catalysts used in our process comprise cuprous compounds.

The principal object of our invention is to provide an improved process for making vinylacetylene from acetylene by the action of solutions of the complex cuprous salts known as chlorocuprites. Another object of the invention is to provide such a process which is efficient and economical in operation and which is a commercially feasible process for the preparation of vinylacetylene. A further object is to provide catalytic solutions for the preparation of vinylacetylene from acetylene which comprise the soluble complex cuprous compounds known as chlorocuprites.

It is known that benzene and higher polymers of acetylene may be formed by the action of heat and catalysts on acetylene, but it has not been found possible to form more than traces of a dimer of acetylene by any variation of the conditions under which benzene (a trimer of acetylene) is formed. Other trimers of acetylene, including divinyl acetylene, have been made by exposing acetylene to silent electric discharge and by the use of cuprous compounds but no method has been disclosed for producing more than traces of any dimer of acetylene by these reactions.

We have found that when acetylene is polymerized by the action of an aqueous chlorocuprite solution the primary product is not divinyl acetylene but vinylacetylene and that the latter may be recovered in nearly quantitative yields, for example, by the procedure hereinafter fully disclosed. On the other hand we have found that when acetylene is polymerized by solid cuprous compounds, or by solutions of cuprous compounds in the presence of a substantial amount of undissolved cuprous compounds, it is not practicable to recover a high yield of vinylacetylene. In this case the product is contaminated with substantial amounts of polymers of higher molecular weight than vinylacetylene and the catalyst becomes fouled with tarry by-products which impair any value it may have for the purposes of our invention.

For the recovery of vinylacetylene in good yields we have found that continuous intimate contact of the catalytic solution with a second phase, either gaseous or liquid, is essential. We prefer to use a gas phase, obtained by passing in an excess of acetylene at the bottom of the solution through a porous device or diffuser.

The following example shows how our invention may be carried out:

Three hundred grams of cuprous chloride, 300 grams of ammonium chloride and 70 cc. of concentrated hydrochloric acid are dissolved in 600 cc. of water and heated to about 90° C. The solution is then filtered to remove any insoluble impurities. The filtrate, very dark due to cupric chloride, with which all ordinary cuprous chloride is contaminated, is placed in an upright tube 2 inches in diameter and 3 feet long. Acetylene gas is introduced into the solution at the lower end of the tube through a diffuser made of porous silica. After about two hours the solution becomes transparent and fades to a light yellow color.

A strong ammonia solution is slowly added (while the passage of acetylene is continued and air is kept from the solution) until a permanent black precipitate is formed. The precipitate is then dissolved by addition of the minimum quantity of hydrochloric acid.

The catalytic solution of ammonium chlorocuprite is now ready for use. It is maintained at about 70° C. and acetylene is injected through the diffusing device at the rate of about 10 liters per hour. This is at the rate of approximately 13 liters per hour per liter of the catalytic solution. The outlet gas contains 24% vinylacetylene, 73% acetylene, and about 3% of higher boiling substances, and the vinylacetylene may be recovered from it by compression, cooling, or scrubbing, followed by fractional distillation.

In this process temperatures above 100° C. should be avoided due to the formation of other substances at the expense of the vinylacetylene. The process is operable at temperatures as low as 20° C., but the reaction proceeds more slowly at these temperatures than at about 70° C. Pressures higher than atmospheric may be used to increase the concentration of acetylene and accelerate the reaction. The catalytic solution is approximately neutral, the purpose of the original acid being to prevent undesirable precipitation which occurs when a neutral solution containing cupric salts is reduced by acetylene. If an acid solution is used the speed of reaction is initially less than that of a neutral solution, but its activity increases as the process proceeds, probably because the excess hydrochloric acid is converted to chlorhydrocarbons and removed.

In the process as described it is essential that the gas phase be in very fine bubbles, such as are formed by passage through porous silica. Contact of the phases is also aided, however, by greater height, so that in a larger installation the bubbles need not be as small. The gas may also be contacted with the liquid by shaking or stirring instead of by the means described.

In the process as described the vinylacetylene is removed from the sphere of reaction by the excess of acetylene. The greater the excess of acetylene the less the amounts of by-products formed, so that better yields than that stated in the example may be obtained, limited only by practical considerations of the inconvenience of separating the product from large amounts of acetylene. If desired the vinylacetylene may be removed by an immiscible liquid phase, such as toluene, xylene, or kerosene. In this case contact must be insured by stirring or shaking, and only a slight blowoff of acetylene is necessary, but the immiscible solvent must be treated (by heat or other known means) from time to time for recovery of vinylacetylene from it. This modification of the process can be made continuous by withdrawing the immiscible solvent portionwise and replacing it with fresh solvent.

The proportions of cuprous chloride and ammonium chloride may be varied, but it is desirable to use an amount of ammonium chloride in excess of the equimolar proportion required to form ammonium chlorocuprite with the cuprous chloride used, and to use sufficient water to form a clear solution. An excess of undissolved cuprous compounds does not prevent the reaction but it causes lower yields and the accumulation of tarry by-products. We have found that shaking or mechanical stirring may be entirely dispensed with and the best results obtained, if solid suspended matter is not present. Other chlorides which form soluble complexes with cuprous chloride, such as sodium, potassium, and preferably calcium chloride, may be substituted for the ammonium chloride.

We claim:—

1. Process of making vinylacetylene which comprises passing acetylene into intimate contact with a substantially neutral aqueous solution essentially comprising cuprous chloride and at least one chloride of the group consisting of ammonium, alkali metal, and alkaline earth metal chlorides, said solution being substantially free from undissolved solid material.

2. Process of making vinylacetylene which comprises passing acetylene into intimate contact with a substantially neutral aqueous solution essentially comprising cuprous chloride and at least one chloride of the group consisting of ammonium, alkali metal, and alkaline earth metal chlorides, said solution being substantially free from undissolved solid material, removing the reaction products from said solution as they are formed, and isolating vinylacetylene from said products.

3. Process of making vinylacetylene which comprises passing acetylene into intimate contact with a substantially neutral aqueous solution containing cuprous chloride and at least one chloride of the group consisting of ammonium, alkali metal, and alkaline earth metal chlorides, said solution being substantially free from undissolved solid material.

4. Process of making vinylacetylene which comprises passing acetylene into intimate contact with a substantially neutral aqueous solution containing cuprous chloride and at least one chloride of the group consisting of ammonium, alkali metal, and alkaline earth metal chlorides, said solution being substantially free from undissolved solid material, removing the reaction products from said solution as they are formed, and isolating vinylacetylene from said products.

5. Process of making vinylacetylene which comprises passing acetylene into intimate contact with a substantially neutral aqueous solution containing cuprous chloride and calcium chloride, said solution being substantially free from cupric copper and undissolved solid material.

6. Process of making vinylacetylene which comprises passing acetylene into intimate contact with a substantially neutral aqueous solution containing cuprous chloride and calcium chloride, said solution being substantially free from cupric copper and undissolved solid material, removing the reaction products from said solution as they are formed, and isolating vinylacetylene from said products.

7. Process of making vinylacetylene which comprises passing an excess of acetylene into intimate contact with a substantially neutral aqueous solution essentially comprising cuprous chloride and at least one chloride of the group consisting of ammonium, alkali metal, and alkaline earth metal chlorides, said solution being substantially free from undissolved solid material, removing outlet gases which have been contacted with said solution and isolating vinylacetylene from said removed gases.

8. Process of making vinylacetylene which comprises diffusing an excess of acetylene in a finely divided state into an aqueous solution essentially comprising cuprous chloride and at least one chloride of the group consisting of ammonium, alkali metal, and alkaline earth metal chlorides, said solution being substantially neutral and substantially free from undissolved solid material, removing outlet gases which have been contacted with said solution, and isolating vinylacetylene from said removed gases.

9. Process of making vinylacetylene which comprises diffusing an excess of acetylene in a finely divided state in an aqueous solution containing cuprous chloride and at least one chloride of the group consisting of ammonium, alkali metal, and alkaline earth metal chlorides, said solution being substantially neutral and substantially free from undissolved solid material, removing outlet gases which have been contacted with said solution, and isolating vinylacetylene from said removed gases.

10. Process for making vinylacetylene which comprises diffusing an excess of acetylene in a finely divided state into a substantially neutral aqueous solution containing cuprous chloride and calcium chloride, said solution being substantially free from undissolved solid material, removing outlet gases which have been contacted with said solution, and isolating vinylacetylene from said removed gases.

11. Process of making vinylacetylene which comprises diffusing acetylene into an aqueous solution maintained at about 70° C. at the rate of about thirteen liters of acetylene per hour per liter of solution, said solution containing approximately equal weights of cuprous chloride and ammonium chlorides, and said solution being substantially neutral and free from undissolved solid material, removing outlet gases which have been contacted with said solution, and isolating vinylacetylene from said removed gases.

12. Process of making vinylacetylene which comprises passing acetylene into intimate contact with a substantially neutral aqueous solution essentially comprising cuprous chloride and at least one chloride of the group consisting of ammonium, alkali metal, and alkaline earth metal chlorides, said solution being substantially free from undissolved solid material; agitating said solution with an immiscible inert organic solvent during the passage of said acetylene to remove the reaction products from said solution as they are formed; and isolating vinylacetylene from said products dissolved in said inert solvent.

13. Process of making vinylacetylene which comprises passing acetylene into intimate contact with a substantially neutral aqueous solution essentially comprising cuprous chloride and at least one chloride of the group consisting of ammonium, alkali metal, and alkaline earth metal chlorides, said solution being substantially free from undissolved solid material; agitating said solution with a hydrocarbon solvent during the passage of said acetylene to remove the reaction products from said solution as they are formed; and isolating vinylacetylene from said products dissolved in said hydrocarbon solvent.

14. Process of making vinylacetylene which comprises passing acetylene into intimate contact with a substantially neutral aqueous solution essentially comprising cuprous chloride and at least one chloride of the group consisting of ammonium, alkali metal and alkaline earth metal chlorides, said solution being substantially free from undissolved solid material; agitating said solution with toluene during the passage of said acetylene to remove the reaction products from said solution as they are formed; and isolating vinylacetylene from said products in said toluene.

15. Process for making vinylacetylene which comprises passing acetylene into intimate contact with a substantially neutral aqueous solution containing approximately equal weights of cuprous chloride, ammonium chloride, and water, said solution being substantially free from undissolved solid material; agitating said solution during the passage of said acetylene with more than its volume of toluene; separating said toluene from said solution; and isolating vinylacetylene from said separated toluene.

16. Process of preparing a catalytic solution of complex chlorocuprites for polymerizing acetylene to vinyl derivatives thereof, which comprises forming a solution of cuprous chloride, hydrochloric acid, and one of the group consisting of ammonium, alkali metal, and alkaline earth metal chlorides; filtering said solution to remove insoluble impurities; reducing said solution with acetylene; making said solution alkaline with ammonia; and neutralizing said solution with hydrochloric acid.

17. Process of preparing a catalytic solution of complex chlorocuprites for polymerizing acetylene to vinyl derivatives thereof, which comprises forming a solution of cuprous chloride, hydrochloric acid, and ammonium chloride; heating said solution; filtering said solution to remove insoluble impurities; intimately contacting said solution with acetylene to reduce all copper present to the cuprous state; adding to said solution a strong ammonia solution until a permanent black precipitate is formed; and dissolving said black precipitate with a minimum quality of hydrochloric acid.

18. Process of preparing a catalytic solution of complex chlorocuprites for polymerizing acetylene to vinyl derivatives thereof, which comprises dissolving about 300 grams of cuprous chloride, about 300 grams of ammonium chloride, and about 70 cc. of concentrated hydrochloric acid in about 600 cc. of water; heating said solution to about 90° C.; filtering said solution to remove insoluble impurities; diffusing acetylene into said solution to reduce all copper present to the cuprous state; adding to said solution a strong ammonia solution until a permanent black precipitate is formed; and dissolving said black precipitate with a minimum quantity of hydrochloric acid.

19. Process of making vinylacetylene which comprises dissolving about 300 grams of cuprous chloride, about 300 grams of ammonium chloride, and about 70 cc. of concentrated hydrochloric acid in about 600 cc. of water; heating said solution to about 90° C.; filtering said solution to remove insoluble impurities; diffusing acetylene into said solution to reduce all copper present to the cuprous state; adding ammonia to said solution until a permanent black precipitate is formed; dissolving said black precipitate with a minimum quantity of hydrochloric acid; diffusing acetylene through the substantially neutral, clear catalytic solution of complex chlorocuprites so formed at the rate of approximately thirteen liters per hour per liter of said catalytic solution while maintaining said catalytic solution at about 70° C.; removing outlet gases from said catalytic solution; and isolating vinylacetylene from said outlet gases.

GRANVILLE A. PERKINS.
WALTER J. TOUSSAINT.